(12) United States Patent
Arndt et al.

(10) Patent No.: US 8,589,556 B2
(45) Date of Patent: Nov. 19, 2013

(54) ALLOCATION OF ENERGY BUDGETS TO INDIVIDUAL PARTITIONS

(75) Inventors: Richard L. Arndt, Austin, TX (US);
Heather L. Hanson, Austin, TX (US);
Charles R. Lefurgy, Austin, TX (US);
Karthick Rajamani, Austin, TX (US);
Freeman L. Rawson, III, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 12/940,273

(22) Filed: Nov. 5, 2010

(65) Prior Publication Data
US 2012/0116599 A1    May 10, 2012

(51) Int. Cl.
*G06F 15/16*    (2006.01)

(52) U.S. Cl.
USPC ............................ 709/226; 713/300; 713/322

(58) Field of Classification Search
USPC ........................................................ 709/226
See application file for complete search history.

(56) References Cited

U.S. PATENT DOCUMENTS

| | | | |
|---|---|---|---|
| 6,363,515 B1 | 3/2002 | Rajgopal et al. | |
| 6,618,811 B1 | 9/2003 | Berthaud et al. | |
| 6,976,178 B1 | 12/2005 | Kissell | |
| 7,155,623 B2 | 12/2006 | Lefurgy et al. | |
| 7,272,732 B2 | 9/2007 | Farkas et al. | |
| 7,421,691 B1 | 9/2008 | Hancock et al. | |
| 7,444,526 B2 | 10/2008 | Felter et al. | |
| 7,496,772 B1 | 2/2009 | Nguyen | |
| 7,644,293 B2 | 1/2010 | Sistla et al. | |
| 7,669,071 B2 | 2/2010 | Cochran et al. | |
| 7,684,876 B2 | 3/2010 | Grgic | |
| 7,702,931 B2 | 4/2010 | Goodrum et al. | |
| 2008/0005591 A1 | 1/2008 | Trautman | |
| 2008/0222435 A1 | 9/2008 | Bolan et al. | |
| 2008/0263373 A1 * | 10/2008 | Meier et al. ................... | 713/300 |
| 2009/0113221 A1 | 4/2009 | Holle et al. | |
| 2009/0119233 A1 | 5/2009 | Dunagan et al. | |
| 2009/0125293 A1 | 5/2009 | Lefurgy et al. | |
| 2010/0011227 A1 * | 1/2010 | Govindan et al. ............. | 713/300 |
| 2010/0100757 A1 * | 4/2010 | Takada et al. ................. | 713/340 |
| 2010/0131957 A1 | 5/2010 | Kami | |
| 2010/0218018 A1 * | 8/2010 | Parker et al. ................... | 713/322 |

OTHER PUBLICATIONS

U.S. Appl. No. 12/172,151.
U.S. Appl. No. 12/495,188.

(Continued)

*Primary Examiner* — Hamza Algibhah
(74) *Attorney, Agent, or Firm* — Francis Lammes; Stephen J. Walder, Jr.; Diana R. Gerhardt (57) ABSTRACT

A mechanism is provided for allocating energy budgets to a plurality of logical partitions. An overall energy budget for the data processing system and a total of a set of requested initial energy budgets for the plurality of partitions are determined. A determination is made as to whether the total of the set of requested initial energy budgets for the plurality of partitions is greater than the overall energy budget for the data processing system. Responsive to the total of the set of requested initial energy budgets exceeding the overall energy budget, an initial energy budget is allocated to each partition in the plurality of partitions based on at least one of priority or proportionality of each partition in the plurality of partitions such that a total of the initial energy budgets for the plurality of partitions does not exceed the overall energy budget of the data processing system.

21 Claims, 5 Drawing Sheets

(56) References Cited

OTHER PUBLICATIONS

Bialecki, Ryszard A. et al., "In-and Out-of-Core BEM Equation Solver with Parallel and Non-Linear Options", International Journal for Numerical Methods in Engineering, vol. 39, Dec. 30, 1996, pp. 4215-4242.

Bounds, Daniel et al., "Optimizing the Data Center: New Dell Servers and the Dell Energy Smart Architecture", Dell Power Solutions, Jun. 2009, pp. 22-26.

Felter, Wes et al., "A Performance-Conserving Approach for Reducing Peak Power Consumption in Server Systems", ICS'05, Jun. 20-22, 2005, 10 pages.

Fischer, Tim et al., "A 90nm Variable-Frequency Clock System for a Power-Managed Itanium-Family Processor", IEEE International Solid-State Circuits Conference, 2005, 3 pages.

Poirier, Christopher et al., "Power and Temperature Control on a 90nm Itanium-Family Processor", IEEE International Solid-State Circuits Conference, 2005, 2 pages.

Stoess, Jan et al., "Energy Management for Hypervisor-Based Virtual Machines", University of Karlsruhe, Apr. 30, 2007, pp. 1-14.

Rawson, III, Freeman L. et al., "Energy Allocation to Groups of Virtual Machines", U.S. Appl. No. 12/940,639, filed Nov. 5, 2010, 38 pages.

Interview Summary mailed May 14, 2012 for U.S. Appl. No. 12/495,188; 3 pages.

Office Action mailed Feb. 21, 2012 for U.S. Appl. No. 12/495,188; 10 pages.

Response to Office Action filed with the USPTO May 11, 2012 for U.S. Appl. No. 12/495,188; 7 pages.

Notice of Allowance mailed May 24, 2012 for U.S. Appl. No. 12/495,188; 5 pages.

U.S. Appl. No. 13/593,672.

U.S. Appl. No. 13/593,717.

\* cited by examiner

ALLOCATION OF ENERGY BUDGETS TO INDIVIDUAL PARTITIONS

BACKGROUND

The present application relates generally to an improved data processing apparatus and method and more specifically to mechanisms for allocating energy budgets to individual partitions.

In current computing systems, there is an emerging user requirement for better power management. Users increasingly expect computing systems to behave in such a way as to be power-efficient. Users also want the ability to set policies that trade off power and performance in order to meet their particular objectives. For example, users want to be able to over-provision their installations relative to the nominal maximum power and temperature values of the systems that they install but be able to take advantage of the variability in workloads and utilization to ensure that the computing systems operate correctly and within the limits of the available power and cooling.

Generally, design and management considerations limit the amount of power provided to a computing system and, thus, energy that the computing system may consume over time. The power supplied to and the energy consumed by the various components in the computing system are generally managed by control systems built into the computing system at various levels. The term "levels" denotes the construction of a computing system out of hardware and software components, such as processors, which are then organized into boards which, in turn, are combined to make whole computing systems. Many computing systems provide a user interface to a power capping mechanism associated with the computing system that allows the user to configure power caps for the computing system, such as an upper bound on the instantaneous power consumed, which then bounds the energy consumption over a fixed period of time. That is, both power and energy over a fixed period of time may be budgeted. However, when a user partitions a computing device in order to run multiple operating system images, a system-wide power cap or energy budget may favor one partition while limiting another partition rather than reflecting the intent of the user.

SUMMARY

In one illustrative embodiment, a method, in a data processing system, is provided for allocating energy budgets to a plurality of logical partitions. The illustrative embodiment determines an overall energy budget for the data processing system. The illustrative embodiment determines a total of a set of requested initial energy budgets for the plurality of partitions. The illustrative embodiment determines whether the total of the set of requested initial energy budgets for the plurality of partitions is greater than the overall energy budget for the data processing system. Responsive to the total of the set of requested initial energy budgets for the plurality of partitions exceeding the overall energy budget of the data processing system, the illustrative embodiment allocates an initial energy budget to each partition in the plurality of partitions based on at least one of priority or proportionality of each partition in the plurality of partitions such that a total of the initial energy budgets for the plurality of partitions does not exceed the overall energy budget of the data processing system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for allocating energy budgets to individual partitions. That is, the illustrative embodiments allocate energy budgets to individual partitions based on a priority associated with the function or workload being performed by the partition with regard to energy management and virtualization. As stated previously, failing to manage energy budgets at a partition level may mean that the behavior of the computing system may not reflect the intent of the user. Partitions may, depending on their behavior, receive more or less than the proportion of total system energy than they should. In turn, an overallocation or an underallocation of power and energy may lead to problems such as performance anomalies. The illustrative embodiments provide for budgeting energy to partitions to match their needs and the user's priorities.

Figure 1:
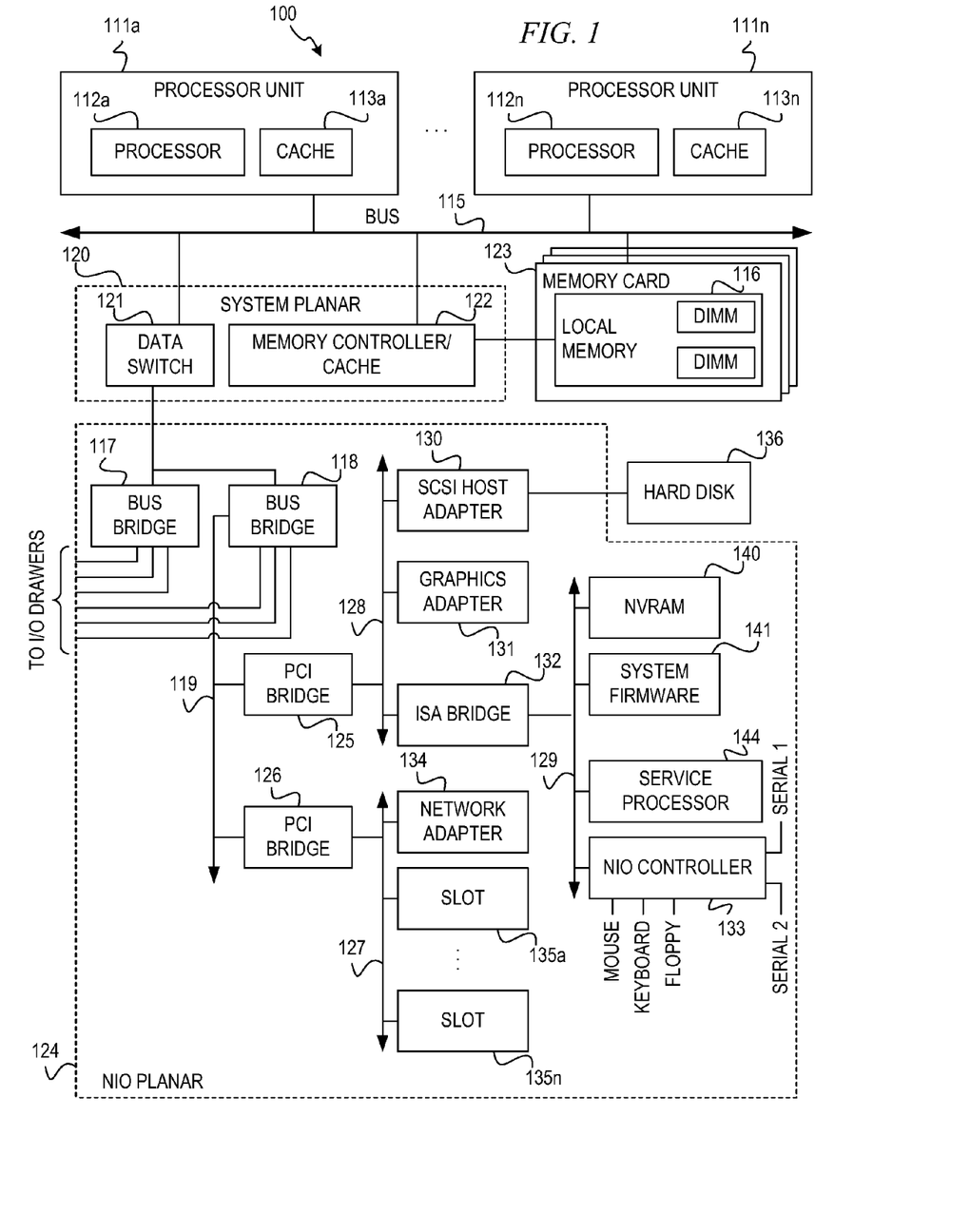
FIG. 1 depicts a block diagram of a data processing system with which aspects of the illustrative embodiments may advantageously be utilized.
Figure 2:
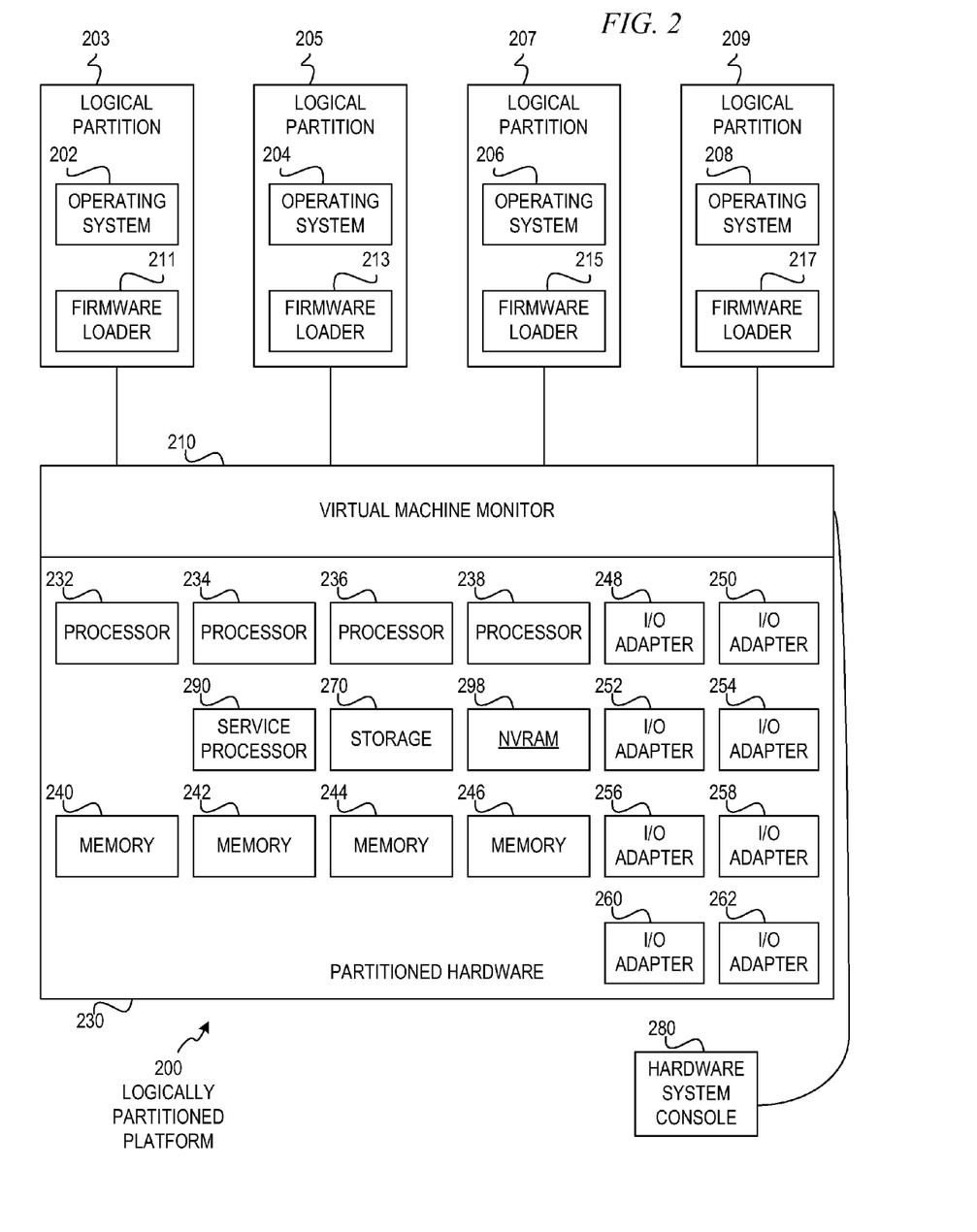
FIG. 2 depicts a block diagram of an exemplary logically partitioned platform in which the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation for allocating energy budgets to individual partitions, this is only an example and is not intended to state or imply any limitation with regard to the features of the present invention. To the contrary, the illustrative embodiments are intended to include distributed data processing environments and embodiments in which energy budgets may be allocated to individual partitions.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

In the illustrative embodiments, a computer architecture is implemented as a combination of hardware and software. The software part of the computer architecture may be referred to as firmware microcode or millicode. The combination of hardware and software creates an instruction set and system architecture that the rest of the computer's software operates on, such as Open Firmware, Virtual Machine Monitors (VMM), Operating Systems, applications, etc. The computer architecture created by the initial combination is immutable to the computer software, except through defined interfaces which may be few.

Referring now to the drawings and in particular to FIG. 1, there is depicted a block diagram of a data processing system with which aspects of the illustrative embodiments may advantageously be utilized. As shown, data processing system 100 includes processor units 111a-111n. Each of processor units 111a-111n includes a processor and a cache memory. For example, processor unit 111a contains processor 112a and cache memory 113a, and processor unit 111n contains processor 112n and cache memory 113n.

Processor units 111a-111n are connected to main bus 115. Main bus 115 supports system planar 120 that contains processor units 111a-111n and memory cards 123. System planar 120 also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. Graphics adapter 131 may be directly or indirectly connected to PCI bus 128. PCI bridge 126 provides connections for external data streams through network adapter 134 and adapter card slots 135a-135n via PCI bus 127.

Industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140, connected to ISA bus 129, provides a non-volatile memory for preserving certain types of data from system disruptions or system failures, such as power supply problems. System firmware 141 is also connected to ISA bus 129 for implementing the initial firmware functions. Service processor 144 connects to ISA bus 129 to provide functionality for system diagnostics or system servicing.

The operating system (OS) is stored on hard disk 136, which may also provide storage for additional application software for execution by a data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel image on hard disk 136, loads the OS kernel image into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN). As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary logically partitioned platform is depicted in which the illustrative embodiments may be implemented. The hardware in logically partitioned platform 200 may be implemented, for example, using the hardware of data processing system 100 in FIG. 1.

Logically partitioned platform 200 includes partitioned hardware 230, operating systems 202, 204, 206, 208, and virtual machine monitor 210. Operating systems 202, 204, 206, and 208 may be multiple copies of a single operating system or multiple heterogeneous operating systems simultaneously run on logically partitioned platform 200. These operating systems may be implemented, for example, using OS/400, which is designed to interface with a virtualization mechanism, such as partition management firmware, e.g., a hypervisor. OS/400 is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software or firmware that may be used to implement a logically partitioned platform (in this example, virtual machine monitor 210) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logical partitions 203, 205, 207, and 209 also include partition firmware loader 211, 213, 215, and 217. Partition firmware loader 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by virtual machine monitor 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware. Among other functions, the logical partition firmware loads the operating system that subsequently executes in the logical partition.

Partitioned hardware 230 includes a plurality of processors 232-238, a plurality of system memory units 240-246, a plurality of input/output (I/O) adapters 248-262, and storage unit 270. Each of the processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Virtual machine monitor 210 performs a number of functions and services for logical partitions 203, 205, 207, and 209 to generate and enforce the partitioning of logical partitioned platform 200. Virtual machine monitor 210 is a firmware implemented virtual machine identical to the underlying hardware. Thus, virtual machine monitor 210 allows the simultaneous execution of independent OS images 202, 204, 206, and 208 by virtualizing all the hardware resources of logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through a hardware system console 280. Hardware system console 280 is a separate data processing system from which a system administrator may perform various functions including reallocation of resources to different logical partitions.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

Again, the illustrative embodiments provide for allocating an energy budget to each partition running on the system in proportion to one or more of the partition's relative priority as specified by the user, the energy demand from the partition, and/or the an overall surplus or deficiency of energy versus the budgeted energy to date. The energy budget for the computing system may be split among the partitions running on the system. The scheme of allocating an energy budget to each partition relies on either an accurate partition-level energy accounting or functions which map between energy values and observable activity levels.

Figure 3:
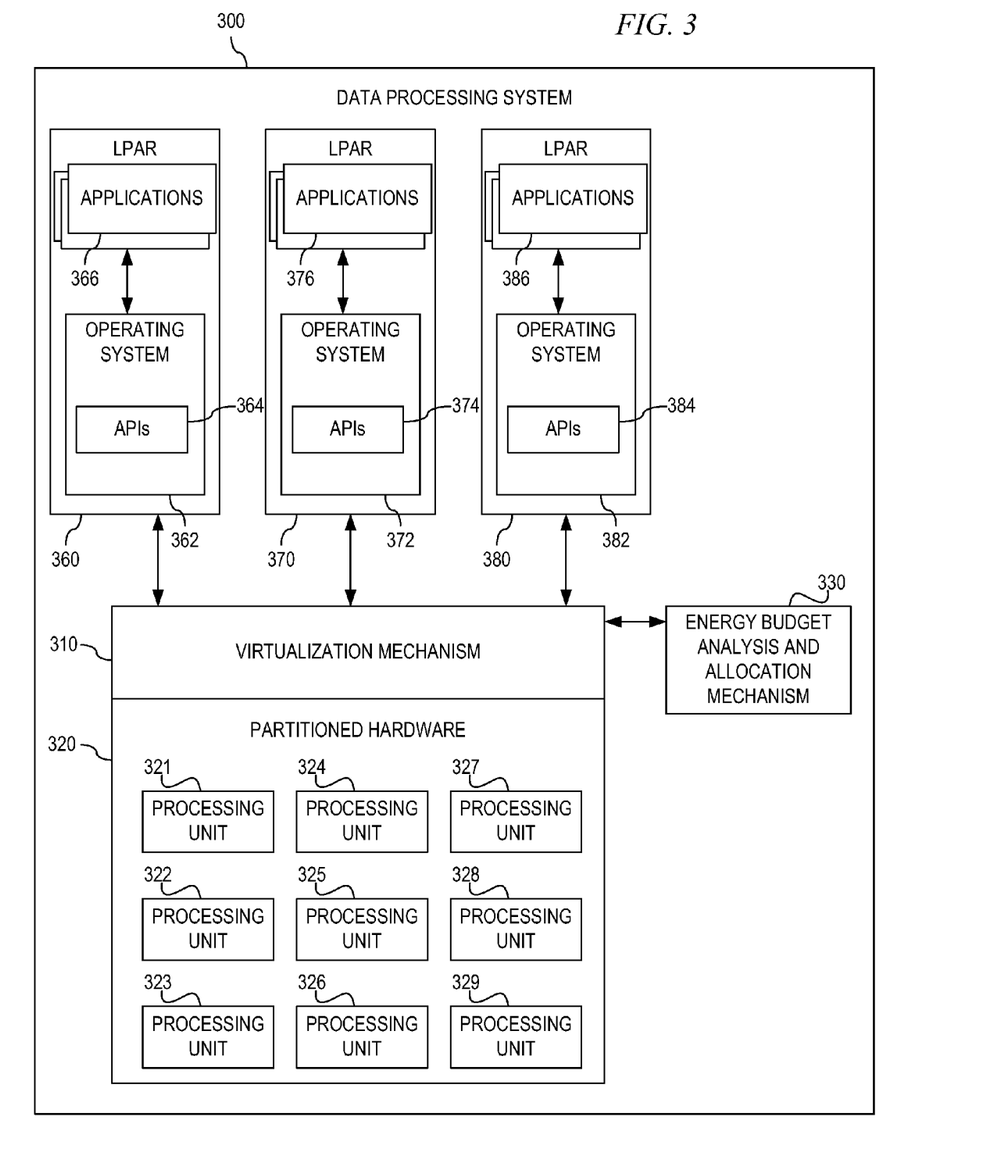
FIG. 3 depicts an exemplary block diagram illustrating a data processing system with a virtualized environment in accordance with an illustrative embodiment.

FIG. 3 depicts an exemplary block diagram illustrating a data processing system with a virtualized environment in accordance with an illustrative embodiment. Logically partitioned data processing system 300 comprises virtualization mechanism 310, partitioned hardware 320, and energy budget analysis and allocation mechanism 330. Virtualization mechanism 310 may be software that performs communications and resource management between partitioned hardware 320, energy budget analysis and allocation mechanism 330, and a plurality of logical partitions (LPARs) 360, 370, and 380. While partitioned hardware 320 is only illustrated as comprising processing units 321-329, other partitioned hardware may be comprised within partitioned hardware 320 as is illustrated in partitioned hardware 230 of FIG. 2. Virtualization mechanism 310 may also perform tasks such as processor time slice sharing, memory allocation, or the like. Virtualization mechanism 310 may be, for example, a hypervisor or a virtual machine monitor, such as virtual machine monitor 210 of FIG. 2.

LPARs 360, 370, and 380 may also be referred to as clients or more commonly as guests. LPAR 360 has an instance of an operating system (OS) 362 with a set of application programming interfaces (APIs) 364 and one or more applications 366 running LPAR 370 has OS 372 with APIs 374 and one or more applications 376. LPAR 380 has OS 382 with APIs 384 and one or more applications 386. While logically partitioned data processing system 300 illustrates only LPARs 360, 370, and 380, the illustrative embodiments are not limited to such. Rather, any number of LPARs may be utilized with the mechanisms of the illustrative embodiments without departing from the spirit and scope of the present invention.

As with all computing systems, data processing system 300 is powered with some type of power and, therefore, within any particular time interval has an energy bound as well. The energy limit may be imposed by design considerations such as a bulk power supply, one or more line cords, or an internal distribution system. The energy limit may also be imposed as a user-specified power cap that may be used for installation planning purposes or to manage costs. In this example, virtualization mechanism 310 may determine an overall energy budget for the first interval of time for data processing system 300 based on values that are initially defined and stored on data processing system 300 and/or request an overall energy budget for it from an administrator of data processing system 300. Virtualization mechanism 310 may then send the overall energy budget for the initial time interval to energy budget analysis and allocation mechanism 330.

Additionally, virtualization mechanism 310 may receive one or more logical partition requests for the creation or destruction of logical partitions, such as LPARs 360, 370, and 380, from a user. Upon receiving a creation request, virtualization mechanism 310 identifies in the request a type of logical partition to be generated, such as a dedicated logical partition, a shared logical partition, or the like, a number of resources, such as processors, processor cores, memory, or the like, that are to be allocated to the logical partition. Additionally, virtualization mechanism 310 attempts to identify in the request an initial energy budget for the first interval of time that is to be used for the partition. If an energy budget is identified, virtualization mechanism 310 may then send the initial energy budget for the partition to energy budget analysis and allocation mechanism 330. If an energy budget is not identified, then virtualization mechanism 310 may send information regarding the number of resources that are allocated to the logical partition to energy budget analysis and allocation mechanism 330. Based on this information, energy budget analysis and allocation mechanism 330 may determine an initial energy budget for the partition based on the configuration of the resources.

With the overall energy budget of data processing system 300 and the individual initial energy budgets for LPARs 360, 370, and 380 identified for the initial interval, energy budget analysis and allocation mechanism 330 initially allocates an energy budget to each of LPARs 360, 370, and 380 that is equal to the identified initial energy budgets so long as the total of the initial energy budgets does not exceed the overall energy budget of data processing system 300. If the total of the initial energy budgets for LPARs 360, 370, and 380 exceeds the overall energy budget of data processing system 300, energy budget analysis and allocation mechanism 330 may either reduce the initial energy budgets for each of LPARs 360, 370, and 380 proportionally based the each of the initial energy budgets requested or identified for each of LPARs 360, 370, and 380, reduce the initial energy budgets for each of LPARs 360, 370, and 380 based on a priority associated with each of LPARs 360, 370, and 380, or reduce the initial energy budgets for each of LPARs 360, 370, and 380 based on some combination of proportionality and priority.

For example, with regard to proportionality, if LPAR 360 has an initial energy budget of 360 watt-seconds for a 1-second interval, LPAR 370 has an initial energy budget of 600 watt-seconds, LPAR 380 has an initial energy budget of 840 watt-seconds, and the overall energy budget of data processing system 300 is 1500 watt-seconds, all for 1-second intervals, then the total individual initial energy budgets of LPARs 360, 370, and 380 exceed the overall energy budgets of data processing system 300 by 300 watts-seconds. In order to properly allocate an initial energy budget to each of LPARs 360, 370, and 380 so that the overall energy budget of data processing system 300 is not exceeded, the energy budget analysis and allocation mechanism 330 may proportionally reduce the initial energy budgets such that LPAR 360 has an allocated energy budget of 300 watt-seconds (a reduction of 60 watt-seconds), LPAR 370 has an allocated energy budget of 500 watt-seconds (a reduction of 100 watt-seconds), and LPAR 380 has an allocated energy budget of 700 watt-seconds (a reduction of 140 watt-seconds). Thus, the total allocated initial energy budget will be 1500 watt-seconds.

With regard to priority, energy budget analysis and allocation mechanism 330 may determine a priority of each of LPARs 360, 370, and 380. The priority of a partition may identified at the time of creation of the partition at the request of the user or may be set by an administrator after the creation of the partition. Thus, the priority is programmable within data processing system 300 and may be changed during the existence of the partition. Again, if the total individual initial energy budgets of LPARs 360, 370, and 380 exceeds the overall energy budgets of data processing system 300, then in order to properly allocate an initial energy budget to each of LPARs 360, 370, and 380 so that the overall energy budget of data processing system 300 is not exceeded, the energy budget analysis and allocation mechanism 330 may reduce the initial energy budgets. For example, if LPAR 360 has a priority of 1, LPAR 370 has a priority of 2, and LPAR 380 has a priority of 3, then energy budget analysis and allocation mechanism 330 may not reduce the allocated energy budget of LPAR 360 leaving LPAR 360 with an allocated energy budget of 360 watt-seconds, may reduce LPAR 370 by 100 watt-seconds leaving LPAR 370 with an allocated energy budget of 500 watt-seconds, and may reduce LPAR 380 by 200 watt-seconds leaving LPAR 380 with an allocated energy budget of 640 watt-seconds. Thus, the total allocated initial energy budget will be 1500 watt-seconds which is equal to the overall energy budget of data processing system 300 of 1500 watt-seconds.

With the initial energy budgets allocated, energy budget analysis and allocation mechanism 330 proceeds to divide time into predetermined intervals $T_i$ and allocate an energy budget to each of LPARs 360, 370, and 380 for the next time interval $T_{i+1}$. In order to adequately allocate an energy budget to each of LPARs 360, 370, and 380 for the next time interval $T_{i+1}$, energy budget analysis and allocation mechanism 330 may either map an energy consumption for each LPAR based on the activities performed by the LPAR on each of partitioned hardware 320 as identified by virtualization mechanism 310 or receive partition-level energy accounting from the operating system on each LPAR, where the operating system performs measurements of the energy consumption.

In order to determine a next energy budget for each of LPARs 360, 370, and 380, energy budget analysis and allocation mechanism 330 uses the following conventions:

Let M be the data processing system 300.
Let $P=\{P_0, P_1, \ldots, P_{n-1}\}$ be the set of logical partitions, such as LPARs 360, 370, and 380, on data processing system 300.
Let $T=T_0, T_1, T_2, \ldots$ be a set of time intervals.
Let $E_{max,i}$ be the energy budget of data processing system 300 during some time interval $T_i$.
Let $E_{meas}(P_j, T_i)$ be the measured energy consumed by each partition $P_j$ during each time interval $T_i$.
Let $E_{meas}(T_i)$ be the measured energy for all of data processing system 300 over the time interval $T_i$.
Let $E_{budget}(P_j, T_i)$ be the energy budget of each partition $P_j$ for the time interval $T_i$.

The basic idea is to obtain a state in data processing system 300 such that the $E_{meas}(T_i)$ is approximately equal to $E_{max,i}$, which in turn, is approximately equal to the sum of the $E_{budget}(P_j, T_i)$ for all of the partitions $P_j$, which in turn, is approximately equal to the sum of the $E_{meas}(P_j, T_i)$ for all of the partitions $P_j$. In order that data processing system 300 does not exceed the energy budget $E_{max,i}$ of data processing system 300, energy budget analysis and allocation mechanism 330 provides a sufficient margin in energy allocation so that data processing system 300 may experience a small deficit (D) during $T_i$ without exceeding $E_{max,i}$, such that a usable energy budget of data processing system 300 ($E_{budget}(M)$) is equal to $E_{max,i}$ minus the small deficit (D). It is also possible that data processing system 300 may experience a surplus S of energy during $T_i$, any surplus S is available for allocation to the partitions at the next time interval $T_{i+1}$.

Energy budget analysis and allocation mechanism 330 also lets $Pr(P_j)$ be the priority of partition $P_j$. The illustrative embodiments assume, without loss of generality, that $Pr(P_0)>=Pr(P_1)>= \ldots >=Pr(P_{j-i})$. In the illustrative embodiments, priorities are set during initialization of the partition. However, an operating system with the partition may request that its priority be altered in order to bid for more energy or release energy to the platform for other uses, which is described in detail below.

Thus, energy budget analysis and allocation mechanism 330 determines, for each partition $P_j$, a surplus and a deficit based on the measured energy $E_{meas}(P_j, T_i)$ versus the previously allocated energy budget $E_{budget}(P_j, T_i)$ for the interval $T_i$. That is, for each $P_j$, energy budget analysis and allocation mechanism 330 calculates $S(P_j, T_i)$ and $D(P_j, T_i)$, where at most only one of $S(P_j, T_i)$ and $D(P_j, T_i)$ will be greater than 0. Based on the individual surpluses or deficits of the partitions, energy budget analysis and allocation mechanism 330 calculates a total surplus $S(T_i)$ or deficit $D(T_i)$ for data processing system 300.

Energy budget analysis and allocation mechanism 330 then distributes an allocation of energy in proportion to each partition $P_j$ based on the priority of the partition. That is, energy budget analysis and allocation mechanism 330 distributes the surplus S or deficit D of data processing system 300 to the partitions to adjust their base energy budgets for the next time interval $T_{i+1}$. The effect is that $E_{budget}(P_j, T_{i+1})=(Pr(P_j)/(\Sigma Pr(Pj)))*E_{budget}(M)$.

For partitions with a surplus, if there is a higher priority partition with a deficit, energy budget analysis and allocation mechanism 330 transfers the surplus to the highest priority partition with a deficit. That is, for each Pj where $S(Pj, T_i)>0$, if there is another $P_k$ such that $Pr(P_j)>Pr(P_k)$ and $D(Pk, T_i)>0$, then for the smallest such $P_j$, $E_{budget}(P_j, T_{i+1})=E_{budget}(P_j, T_i)+S(P_k, T_i)$ and $E_{budget}(P_k, T_{i+1})=E_{budget}(P_k, T_i)-S(P_k, T_i)$.

If $E_{budget}(M)$ of data processing system 300 indicates a surplus and all partitions have a surplus or exactly meet the budget target (no partition has a deficit), energy budget analysis and allocation mechanism 330 reduces the energy budget $E_{budget}(P_j, T_{i+1})$ to cut their surpluses in half in order to align the energy budgets with the measured energy consumption of the system. In other words, if $S(M)>0$ and for all $P_j$, $S(P_j, T_i)>0$, $E_{budget}(P_j, T_{i+1})=E_{budget}(P_j, T_i)-\frac{1}{2}*S(P_j, T_i)$. Energy budget analysis and allocation mechanism 330 then repeats the process for the next interval. Although the formulation presented above is in terms of energy, the illustrative embodiments recognize that a corresponding formulation in terms of power is also possible where the energy budget becomes a power limit.

Energy budget analysis and allocation mechanism 330 may then send the energy budget for each partition $E_{budget}(P_j, T_{i+1})$ to virtualization mechanism 310 for enforcement. Virtualization mechanism 310 may either loosen constraints on partitions that adhere closely to their energy budgets or tighten constraints on partitions that tend to continuously run either deficits or surpluses. In another embodiment, energy budget analysis and allocation mechanism 330 may communicate the energy budget for each partition $E_{budget}(P_j, T_{i+1})$ back to the operating system image running in each partition $P_j$. Using this information, the operating system may cooperate with virtualization mechanism 310 to manage the energy budget by either setting an energy state that is bounded by the constraints of the energy budget $E_{budget}(P_j, T_{i+1})$ or making power-aware decisions about the amount of work to schedule during the time interval $T_{i+1}$. Enforcement of the energy budget by either the operating system in the partition or virtualization mechanism 310, may be performed by proportional adjustment of the frequencies of the processors of the partitioned hardware 320 associated with the partitions. That is, the frequencies of the processors of the partitioned hardware 320 may be decreased to correct a deficit in relation to the size of the deficit correction or may be increased to correct a surplus in relation to the size of the surplus correction. The illustrative embodiments also recognize that other energy-consumption control mechanisms may also be used without departing from the spirit and scope of the invention.

Thus, the illustrative embodiments provide a mechanism for allocating energy budgets to individual partitions. That is, the illustrative embodiments allocate energy budgets to individual partitions based on a priority associated with the function or workload being performed by the partition with regard to energy management and virtualization. Partitions may, depending on their behavior, receive more or less than the proportion of total system energy than they should. The illustrative embodiments provide for budgeting energy to partitions to match their needs and the user's priorities.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
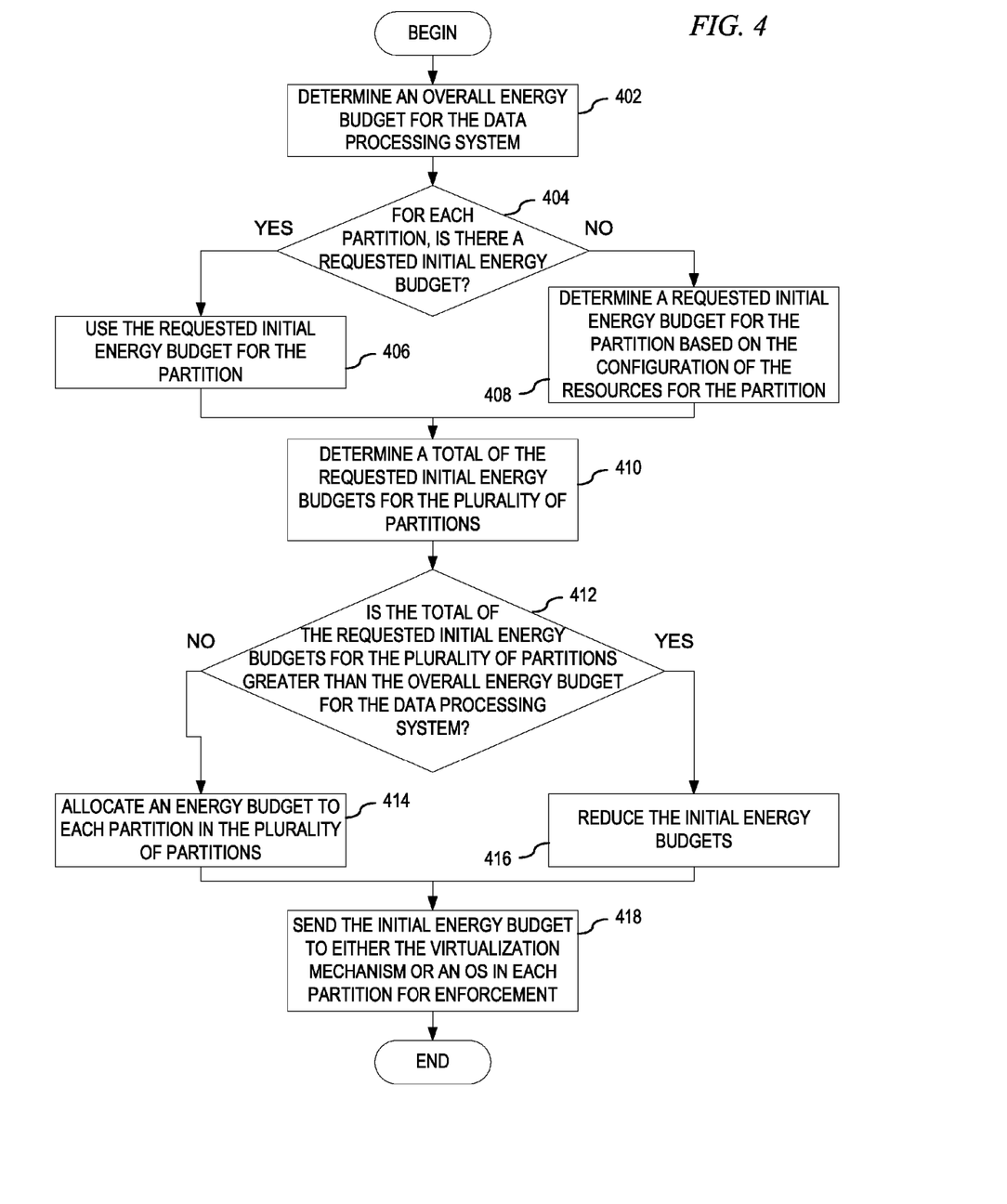
FIG. 4 depicts an example of the operation performed in setting energy budgets for the initial time interval for the plurality of partitions in accordance with an illustrative embodiment.
Figure 5:
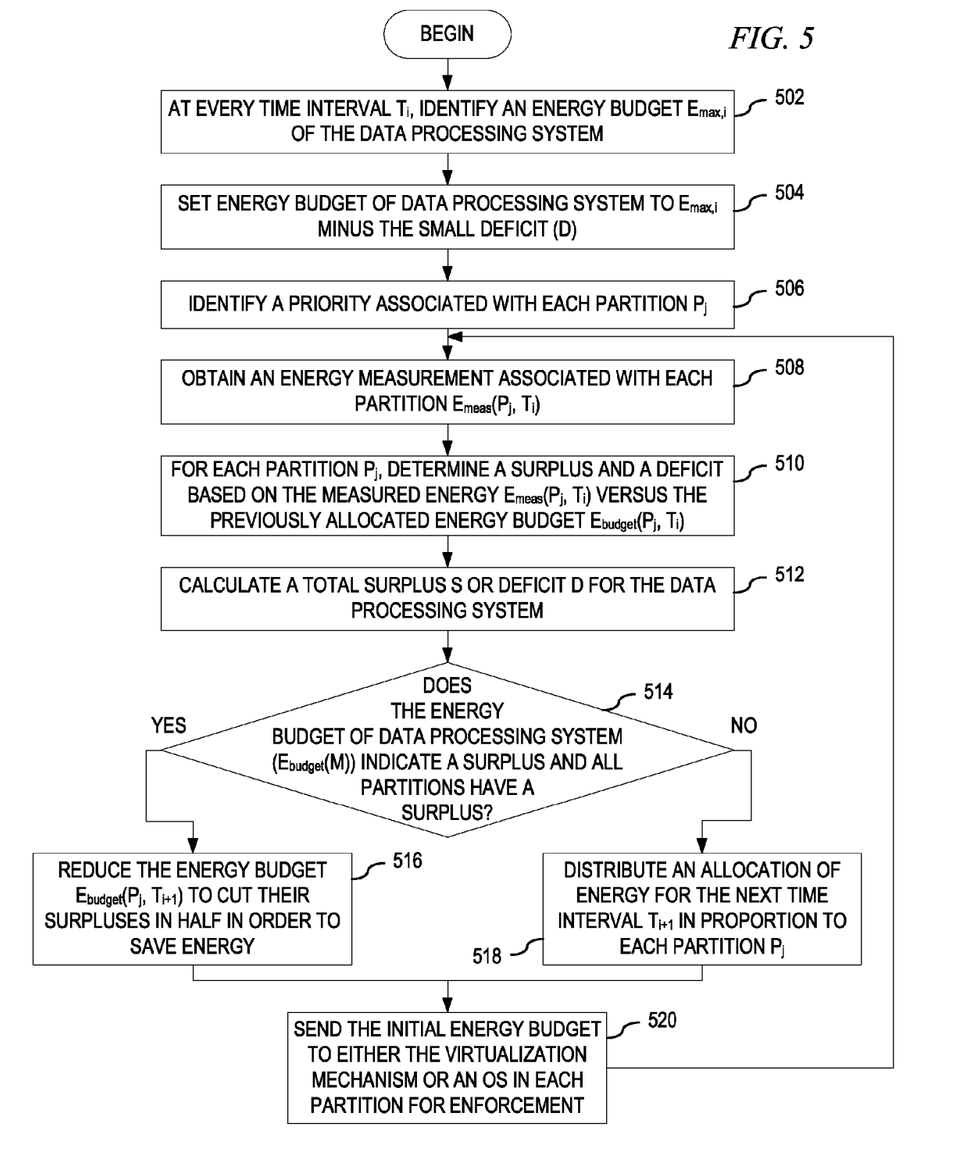
FIG. 5 depicts an example of the operation performed in allocating energy budgets at predetermined time intervals for a plurality of partitions in a data processing system in accordance with an illustrative embodiment.

Referring now to FIGS. 4-5, these figures provide flowcharts outlining example operations of allocating energy budgets to a plurality of logical partitions in a data processing system. FIG. 4 depicts an example of the operation performed in setting energy budgets for the initial time interval for the plurality of partitions in accordance with an illustrative embodiment. As the operation begins, a virtualization mechanism and/or a energy budget analysis and allocation mechanism determines an overall energy budget for the data processing system (step 402). The initial energy budget for the data processing system may be either initially defined and stored on the data processing system or the virtualization mechanism may request an overall energy budget from an administrator of the data processing system.

The virtualization mechanism and/or the energy budget analysis and allocation mechanism then determines whether each partition in a plurality of partitions has an associated requested initial energy budget that is to be used for the partition (step 404). If at step 404 a requested initial energy budget is identified, the energy budget analysis and allocation mechanism uses the requested initial energy budget for the partition (step 406). If at step 404 the requested initial energy budget is not identifiable, then the energy budget analysis and allocation mechanism determines a requested initial energy budget for the partition based on the configuration of the resources for the partition (step 408).

From steps 406 or 408, the energy budget analysis and allocation mechanism determines a total of the requested initial energy budgets for the plurality of partitions (step 410). The energy budget analysis and allocation mechanism then determines whether the total of the requested initial energy budgets for the plurality of partitions is greater than the overall energy budget for the data processing system (step 412). If at step 412 the total of the requested initial energy budgets for the plurality of partitions fails to exceed the overall energy budget of the data processing system, then the energy budget analysis and allocation mechanism allocates the requested initial energy budget to each partition in the plurality of partitions (step 414). If at step 412 the total of the requested initial energy budgets for the plurality of partitions exceeds the overall energy budget of the data processing system, then the energy budget analysis and allocation mechanism may either reduce initial energy budgets of the partitions proportionally based on each of the requested initial energy budgets requested or identified, reduce the initial energy budgets of the partitions based on a priority associated with each of the partitions, or reduce the initial energy budgets of the partitions based on some combination of proportionality and priority such that the total of the initial energy budgets for the plurality of partitions does not exceed the overall energy budget of the data processing system (step 416). From steps 414 or 416, the energy budget analysis and allocation mechanism then sends the initial energy budget for each partition $E_{budget}(P_j, T_i)$ to either the virtualization mechanism or a respective operating system on each partition for enforcement (step 418), with the operation terminating thereafter.

FIG. 5 depicts an example of the operation performed in allocating energy budgets at predetermined time intervals for a plurality of partitions in a data processing system in accordance with an illustrative embodiment. The operation is executed at the end of each time interval to set the energy budgets for the plurality of partitions for the next interval. As the operation begins, the energy budget analysis and allocation mechanism identifies an energy budget $E_{max,i}$ of the data processing system at some time interval $T_i$ (step 502). The energy budget analysis and allocation mechanism then provides a sufficient margin in energy allocation so that the data processing system may experience a small deficit (D) during $T_i$ without exceeding $E_{max,i}$, such that usable energy budget of data processing system ($E_{budget}(M)$) is equal to $E_{max,i}$ minus the small deficit (D) (step 504). The energy budget analysis and allocation mechanism identifies a priority associated with each partition $P_j$ (step 506) and then proceeds to obtain an energy measurement associated with each partition $E_{meas}(P_j, T_i)$ (step 508).

The energy budget analysis and allocation mechanism determines, for each partition $P_j$, a surplus and a deficit based on the measured energy $E_{meas}(P_j, T_i)$ versus a previously allocated energy budget $E_{budget}(P_j, T_i)$ (step 510). That is, for each partition $P_j$, the energy budget analysis and allocation mechanism calculates $S(P_j, T_i)$ and $D(P_j, T_i)$, where at most only one of $S(P_j, T_i)$ and $D(P_j, T_i)$ will be greater than 0. Based on the individual surpluses or deficits of the partitions, the energy budget analysis and allocation mechanism calculates a total surplus S or a total deficit D for the data processing system (step 512).

The energy budget analysis and allocation mechanism determines whether, based on the energy budget of data processing system ($E_{budget}(M)$), the entire data processing system indicates a surplus and all partitions have a surplus (step 514). If at step 514 the energy budget of data processing system ($E_{budget}(M)$) indicates a surplus and no partitions have a deficit, then the energy budget analysis and allocation mechanism reduces the surplus energy budget $E_{budget}(P_j, T_{i+1})$ to reduce the surpluses of the partitions in half in order to align the energy budgets with the measured energy consumption of the system (step 516). In other words, if $S(M) > 0$ and for all $P_j$, $S(P_j, T_i) > 0$, $E_{budget}(P_j, T_{i+1}) = E_{budget}(P_j, T_{i+1}) - \frac{1}{2} * S(P_j, T_i)$.

If at step 514 the energy budget of data processing system ($E_{budget}(M)$) fails to indicate a surplus or not all of the partitions have a surplus, then the energy budget analysis and allocation mechanism determines a next energy budget for the next time interval $T_{i+1}$ in proportion to each partition $P_j$ based on the priority of the partition and whether there is a surplus or a deficit in the partition such that $E_{budget}(P_j, T_{i+1}) = (Pr(P_j)/(\Sigma Pr(Pj))) * E_{budget}(M)$ (step 518). For partitions with a surplus, if there is a higher priority partition with a deficit, the energy budget analysis and allocation mechanism transfers the surplus to the highest priority partition with a deficit. That is, for each Pj where $S(Pj, T_i) > 0$, if there is another $P_k$ such that $Pr(P_j)>Pr(P_k)$ and $D(Pj, T_i)>0$, then for the smallest such $P_j$, $E_{budget}(P, T_{i+1})=E_{budget}(P_j, T_i)+S(P_k, T_i)$ and $E_{budget}(P_k, T_{i+1})=E_{budget}(P_k, T_i)-S(P_k, T_i)$. From steps 516 or 518, the energy budget analysis and allocation mechanism sends either the surplus energy budget or the next energy budget to either the virtualization mechanism or a respective operating system on each partition for enforcement (step 520), with the operation returning to step 508 thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for allocating an energy budget to each partition running on the system in relation to one or more of the partition's relative priority as specified by the user, the energy demand from the partition, and/or the an overall surplus or deficiency of energy versus the budgeted energy to date. The energy budget for the computing system may be split among the partitions running on the system. The scheme of allocating an energy budget to each partition relies on either an accurate partition-level energy accounting or functions which map between energy values and observable activity levels.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for allocating energy budgets to a plurality of logical partitions, the method comprising:

determining, by a processor, an overall energy budget for the data processing system;

determining, by the processor, a total of a set of requested initial energy budgets for the plurality of partitions;

determining, by the processor, whether the total of the set of requested initial energy budgets for the plurality of partitions is greater than the overall energy budget for the data processing system;

responsive to the total of the set of requested initial energy budgets for the plurality of partitions exceeding the overall energy budget of the data processing system, allocating, by the processor, an initial energy budget $E_{budget}(P_j, T_i)$ to each partition in the plurality of partitions based on at least one of priority or proportionality of each partition in the plurality of partitions such that a total of the initial energy budgets for the plurality of partitions does not exceed the overall energy budget of the data processing system;

at an end of each time interval $T_i$, identifying, by the processor, an energy budget $E_{max,i}$ the data processing system;

setting, by the processor, a usable energy budget of data processing system ($E_{budget}(M)$) equal to $E_{max,i}$ minus a small deficit (D);

obtaining, by the processor, an energy measurement associated with each partition $E_{meas}(P_j, T_i)$ in the plurality of partitions;

determining, by the processor, for each partition $P_j$, a surplus and a deficit based on the measured energy $E_{means}(P_j, T_i)$ versus a previously allocated energy budget $E_{budget}(P_j, T_i)$;

calculating, by the processor, a total surplus S or a total deficit D for the data processing system;

determining, by the processor, whether the data processing system indicates a surplus and whether any partitions have a deficit;

responsive to the data processing system indicating a surplus and no partitions having a deficit, reducing, by the processor, a surplus energy budget of each partition $E_{budget}(P_j, T_{i+1})$ to reduce surpluses of each of the partitions; and allocating, by the processor, the surplus energy budget $E_{budget}(P_j, T_{i+1})$ to each partition in the plurality of partitions.

2. The method of claim 1, wherein, responsive to the total of the set of requested initial energy budgets for the plurality of partitions exceeding the overall energy budget of the data processing system, the processor performs at least one of reducing the initial energy budget of each partition in the plurality of partitions proportionally based on the requested initial energy budget of the partition;

reducing the initial energy budget of each partition in the plurality of partitions based on a priority associated with each partition, wherein, for lower priority partitions with a surplus in their currently allocated energy budgets, if there is at least one higher priority partition with a deficit in its currently allocated energy budget, the processor transfers the surplus in the currently allocated energy budget to the highest priority partition with the deficit in its currently allocated energy budget; or reducing the initial energy budgets of each partition in the plurality of partitions based on a combination of proportionality and priority.

3. The method of claim 1, further comprising:
sending, by the processor, the initial energy budget for each partition to either the virtualization mechanism or an operating system within the respective partition for enforcement.

4. The method of claim 1, further comprising:
responsive to the total of the set of initial energy budgets for the plurality of partitions failing to exceed the overall energy budget of the data processing system, allocating, by the processor, the requested initial energy budget to each partition in the plurality of partitions.

5. The method of claim 1, wherein the surplus energy budget is determined using the following formula:

$$E_{budget}(P_j, T_{i+1}) = E_{budget}(P_j, T_{i+1}) - 1/2 * S(P_j, T_i).$$

6. The method of claim 1, further comprising:
responsive to the data processing system failing to indicate a surplus or all partitions failing to have a surplus, determining, by the processor, a next energy budget for the next time interval $T_{i+1}$ in proportion to each partition $P_j$ based on the priority of the partition and whether there is a surplus or a deficit in the partition; and allocating, by the processor, the next energy budget $E_{budget}(P_j, T_{i+1})$ to each partition in the plurality of partitions.

7. The method of claim 6, wherein the next energy budget is determined using the following formula:

$$E_{budget}(P_j, T_{i+1}) = (Pr(P_j)/(\Sigma Pr(Pj))) * E_{budget}(M).$$

8. A computer program product comprising a non-transitory computer readable storage medium having a computer readable program stored therein, wherein the computer readable program, when executed on a computing device, causes the computing device to:

determine an overall energy budget for the data processing system;

determine a total of a set of requested initial energy budgets for the plurality of partitions;

determine whether the total of the set of requested initial energy budgets for the plurality of partitions is greater than the overall energy budget for the data processing system;

responsive to the total of the set of requested initial energy budgets for the plurality of partitions exceeding the overall energy budget of the data processing system, allocate an initial energy budget $E_{budget}(P_j, T_i)$ to each partition in the plurality of partitions based on at least one of priority or proportionality of each partition in the plurality of partitions such that a total of the initial energy budgets for the plurality of partitions does not exceed the overall energy budget of the data processing system;

at an end of each time interval $T_i$, identify an energy budget $E_{max,i}$ of the data processing system;

set a usable energy budget of the data processing system ($E_{budget}(M)$) equal to $E_{max,i}$ minus a small deficit (D);

obtain an energy measurement associated with each partition $E_{meas}(P_j, T_i)$ in the plurality of partitions;

determine for each partition $P_j$, a surplus and a deficit based on the measured energy $E_{meas}(P_j, T_i)$ versus a previously allocated energy budget $E_{budget}(P_j, T_i)$;

calculate a total surplus S or a total deficit D for the data processing system;

determine whether the data processing system indicates a surplus and whether any partitions have a deficit;

responsive to the data processing system indicating a surplus and no partitions having a deficit, reduce a surplus energy budget of each partition $E_{budget}(P_j, T_{i+1})$ to reduce surpluses of each of the partitions; and allocate the surplus energy budget $E_{budget}(P_j, T_{i+1})$ to each partition in the plurality of partitions.

9. The computer program product of claim 8, wherein, responsive to the total of the set of requested initial energy budgets for the plurality of partitions exceeding the overall energy budget of the data processing system, the computer readable program further causes the computing device to perform at least one of:

reducing the initial energy budget of each partition in the plurality of partitions proportionally based on the requested initial energy budget of the partition;

reducing the initial energy budget of each partition in the plurality of partitions based on a priority associated with each partition, wherein, for lower priority partitions with a surplus in their currently allocated energy budgets, if there is at least one higher priority partition with a deficit in its currently allocated energy budget, the processor transfers the surplus in the currently allocated energy budget to the highest priority partition with the deficit in its currently allocated energy budget; or reducing the initial energy budgets of each partition in the plurality of partitions based on a combination of proportionality and priority.

10. The computer program product of claim 8, wherein the computer readable program further causes the computing device to:

send the initial energy budget for each partition to either the virtualization mechanism or an operating system within the respective partition for enforcement.

11. The computer program product of claim 8, wherein the computer readable program further causes the computing device to:

responsive to the total of the set of initial energy budgets for the plurality of partitions failing to exceed the overall energy budget of the data processing system, allocate the requested initial energy budget to each partition in the plurality of partitions.

12. The computer program product of claim 8, wherein the surplus energy budget is determined using the following formula:

$$E_{budget}(P_j, T_{i+1}) = E_{budget}(P_j, T_{i+1}) - 1/2 * S(P_j, T_i).$$

13. The computer program product of claim 8, wherein the computer readable program further causes the computing device to:

responsive to the data processing system failing to indicate a surplus or all partitions failing to have a surplus, determine a next energy budget for the next time interval $T_{i+1}$ in proportion to each partition $P_j$ based on the priority of the partition and whether there is a surplus or a deficit in the partition; and allocate the next energy budget $E_{budget}(P_j, T_{i+1})$ to each partition in the plurality of partitions.

14. The computer program product of claim 13, wherein the next energy budget is determined using the following formula:

$$E_{budget}(P_j, T_{i+1}) = (Pr(P_j)/(\Sigma Pr(Pj))) * E_{budget}(M).$$

15. An apparatus, comprising:

a processor; and a memory coupled to the processor, wherein the memory comprises instructions which, when executed by the processor, cause the processor to:

determine an overall energy budget for the data processing system;

determine a total of a set of requested initial energy budgets for the plurality of partitions;

determine whether the total of the set of requested initial energy budgets for the plurality of partitions is greater than the overall energy budget for the data processing system;

responsive to the total of the set of requested initial energy budgets for the plurality of partitions exceeding the overall energy budget of the data processing system, allocate an initial energy budget $E_{budget}(P_j, T_i)$ to each partition in the plurality of partitions based on at least one of priority or proportionality of each partition in the plurality of partitions such that a total of the initial energy budgets for the plurality of partitions does not exceed the overall energy budget of the data processing system;

at an end of each time interval $T_i$, identify an energy budget $E_{max,i}$ of the data processing system;

set a usable energy budget of data processing system ($E_{budget}(M)$) equal to $E_{max,i}$ minus a small deficit (D);

obtain an energy measurement associated with each partition $E_{meas}(P_j, T_i)$ in the plurality of partitions;

determine for each partition $P_j$, a surplus and a deficit based on the measured energy $E_{meas}(P_j, T_i)$ versus a previously allocated energy budget $E_{budget}(P_j, T_i)$;

calculate a total surplus S or a total deficit D for the data processing system;

determine whether the data processing system indicates a surplus and whether any partitions have a deficit;

responsive to the data processing system indicating a surplus and no partitions having a deficit, reduce a surplus energy budget of each partition $E_{budget}(P_j, T_{i+1})$ to reduce surpluses of each of the partitions; and allocate the surplus energy budget $E_{budget}(P_j, T_{i+1})$ to each partition in the plurality of partitions.

16. The apparatus of claim 15, wherein, responsive to the total of the set of requested initial energy budgets for the plurality of partitions exceeding the overall energy budget of the data processing system, the instructions further cause the processor to perform at least one of:

reducing the initial energy budget of each partition in the plurality of partitions proportionally based on the requested initial energy budget of the partition;

reducing the initial energy budget of each partition in the plurality of partitions based on a priority associated with each partition, wherein, for lower priority partitions with a surplus in their currently allocated energy budgets, if there is at least one higher priority partition with a deficit in its currently allocated energy budget, the processor transfers the surplus in the currently allocated energy budget to the highest priority partition with the deficit in its currently allocated energy budget; or reducing the initial energy budgets of each partition in the plurality of partitions based on a combination of proportionality and priority.

17. The apparatus of claim 15, wherein the instructions further cause the processor to:

send the initial energy budget for each partition to either the virtualization mechanism or an operating system within the respective partition for enforcement.

18. The apparatus of claim 15, wherein the instructions further cause the processor to:

responsive to the total of the set of initial energy budgets for the plurality of partitions failing to exceed the overall energy budget of the data processing system, allocate the requested initial energy budget to each partition in the plurality of partitions.

19. The apparatus of claim 15, wherein the surplus energy budget is determined using the following formula:

$$E_{budget}(P_j, T_{i+1}) = E_{budget}(P_j, T_{i+1}) - 1/2 * S(P_j, T_i).$$

20. The apparatus of claim 15, wherein the instructions further cause the processor to:

responsive to the data processing system failing to indicate a surplus or all partitions failing to have a surplus, determine a next energy budget for the next time interval $T_{i+1}$ in proportion to each partition $P_j$ based on the priority of the partition and whether there is a surplus or a deficit in the partition; and allocate the next energy budget $E_{budget}(P_j, T_{i+1})$ to each partition, in the plurality of partitions.

21. The apparatus of claim 20, wherein the next energy budget is determined using the following formula;

$$E_{budget}(P_j, T_{i+1}) = (Pr(P_j)/(\Sigma Pr(Pj))) * E_{budget}(M).$$

* * * * *